United States Patent
Lv et al.

(10) Patent No.: US 9,335,573 B2
(45) Date of Patent: May 10, 2016

(54) LIQUID CRYSTAL DISPLAY DEVICE AND DRIVING METHOD THEREOF

(71) Applicant: Shanghai Tianma Micro-Electronics Co., Ltd., Shanghai (CN)

(72) Inventors: Bojia Lv, Shanghai (CN); Dong Qian, Shanghai (CN); Xiangzi Kong, Shanghai (CN); Hanyu Gu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 5 days.

(21) Appl. No.: 14/077,175

(22) Filed: Nov. 11, 2013

(65) Prior Publication Data

US 2014/0071361 A1 Mar. 13, 2014

Related U.S. Application Data

(63) Continuation of application No. PCT/CN2012/084263, filed on Nov. 8, 2012.

(30) Foreign Application Priority Data

Jul. 24, 2012 (CN) .......................... 2012 1 0258179

(51) Int. Cl.
*G09G 3/36* (2006.01)
*G02F 1/133* (2006.01)
*G02F 1/1362* (2006.01)

(52) U.S. Cl.
CPC ...... *G02F 1/13306* (2013.01); *G02F 1/136286* (2013.01); *G09G 3/3614* (2013.01); *G09G 3/3655* (2013.01); *G09G 3/3677* (2013.01); *G02F 2001/136272* (2013.01); *G09G 2300/0413* (2013.01); *G09G 2300/0426* (2013.01); *G09G2310/0286* (2013.01); *G09G 2310/06* (2013.01); *G09G 2320/0223* (2013.01)

(58) Field of Classification Search
CPC ............. G09G 3/34; G09G 3/36; G09G 3/30; G09G 3/28; G09G 3/10; G09G 5/10; G09G 5/02
USPC ......................... 345/84, 87, 98, 100, 211, 212
See application file for complete search history.

(56) References Cited

U.S. PATENT DOCUMENTS

| | | | |
|---|---|---|---|
| 5,867,139 A | 2/1999 | Tanaka et al. | |
| 2003/0043104 A1* | 3/2003 | Lee et al. | 345/92 |
| 2010/0245328 A1* | 9/2010 | Sasaki et al. | 345/211 |

(Continued)

FOREIGN PATENT DOCUMENTS

| | | |
|---|---|---|
| CN | 101071212 A | 11/2007 |
| CN | 101118357 A | 2/2008 |

(Continued)

*Primary Examiner* — Pegeman Karimi
(74) *Attorney, Agent, or Firm* — Alston & Bird LLP (57) ABSTRACT

A liquid crystal display device is disclosed. The device includes data lines, gate lines, and common lines in parallel with the gate lines. The device also includes at least one dummy gate line in parallel with the gate lines, gate line trigger circuits, and common line trigger circuits. One end of the last gate line is connected with the last gate line trigger circuit, one end of each of remaining gate lines is connected with a gate line trigger circuit corresponding to said each of remaining gate lines, and the other end of said each of the remaining gate lines is connected with a next gate line trigger circuit. The first common line trigger circuit is connected with one dummy gate line, and each of remaining common line trigger circuits is connected with one or more preceding gate line trigger circuits.

19 Claims, 8 Drawing Sheets

(56) References Cited

U.S. PATENT DOCUMENTS

2011/0222645 A1  9/2011  Tobita
2014/0009457 A1* 1/2014  Wu et al. ...................... 345/212

FOREIGN PATENT DOCUMENTS

| CN | 101295113 A | 10/2008 |
|---|---|---|
| JP | 2007171737 A | 7/2007 |

* cited by examiner

LIQUID CRYSTAL DISPLAY DEVICE AND DRIVING METHOD THEREOF

CROSS-REFERENCES TO RELATED APPLICATIONS

This application claims priority to and is a continuation of PCT/CN2012/084263, filed on Nov. 8, 2012 and entitled "LIQUID CRYSTAL DISPLAY DEVICE AND DRIVING METHOD THEREOF", which claims the benefit of Chinese Patent Application No. 201210258179.1, filed with the Chinese Patent Office on Jul. 24, 2012 and entitled "LIQUID CRYSTAL DISPLAY DEVICE AND DRIVING METHOD THEREOF", the contents of which are incorporated herein by reference in their entirety.

FIELD OF THE INVENTION

The present invention relates to flat panel display technologies, and in particular to a liquid crystal display device and a driving method of the liquid crystal display device.

BACKGROUND OF THE INVENTION

Figure 1:
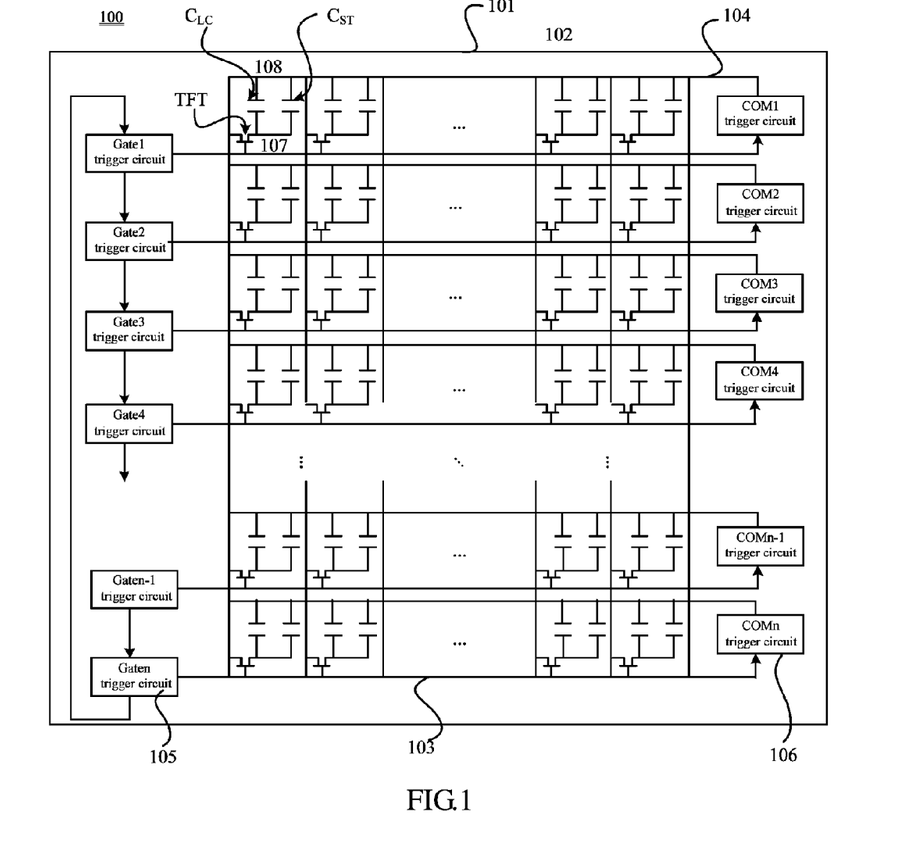
FIG. 1 is a schematic view of a traditional liquid crystal display device.

In a traditional liquid crystal display device, an electric field is used to control the orientation of liquid crystal molecules to display an image. As shown in FIG. 1, the traditional liquid crystal display device 100 includes a liquid crystal panel 101, a plurality of data lines 102 formed on the liquid crystal panel 101, a plurality of gate lines 103, a plurality of common lines 104, a plurality of gate line trigger circuits (including a trigger circuit Gate 1, a trigger circuit Gate 2, a trigger circuit Gate 3, a trigger circuit Gate 4 . . . a trigger circuit Gate n−1, and a trigger circuit Gate n), and a plurality of common line trigger circuits (including a trigger circuit COM 1, a trigger circuit COM 2, a trigger circuit COM 3, a trigger circuit COM 4 . . . a trigger circuit COM n−1, and a trigger circuit COM n).

In FIG. 1, a first direction is defined by the vertical direction, while a second direction is defined by the horizontal direction. The data lines 102 extend in the first direction, the gate lines 103 extend in the second direction and intersect with the data lines 102, and the common lines 104 are in parallel with the gate lines 103 and intersect with the data lines 102. The regions defined by the plurality of data lines 102 and the plurality of gate lines 103 are used as display regions. The liquid crystal panel 101 is provided with Thin-Film-Transistors (TFTs), each of which is used to drive a liquid crystal element $C_{LC}$ located at the intersection. Furthermore, the liquid crystal panel 101 is equipped with storage capacitors $C_{ST}$ for maintaining the voltages of the liquid crystal elements $C_{LC}$. The TFT is turned on if its gate is applied with a gate voltage by the gate line 103. At this time, if a drive voltage is provided to a pixel electrode 107 via the data line 102 and a common voltage is provided to a common electrode 108 via the common line 104, an electric field is generated on the liquid crystal element $C_{LC}$ to change the arrangement of the liquid crystal molecules, so as to control the light transmittance of the liquid crystal element $C_{LC}$.

In the liquid crystal panel 101, one end of each of the gate lines 103 is connected to one gate line trigger circuit which is used to selectively provide a gate voltage to the gate line 103; and the other end of the gate line 103 is connected to a common line trigger circuit in the row of the gate line, and is used to trigger the common line trigger circuit and to selectively provide a common voltage to the common line 104 in the row. The gate line trigger circuit is located on one side of the display region and the common line trigger circuit is located on the other side of the display region. When a common voltage is applied to the common electrode and a gate voltage is inputted to apply a data voltage to the pixel electrode 107, the charging of the storage capacitor $C_{ST}$ is started, and the charging ends once the gate voltage is removed and the TFT is turned off. Here, the time for the charging of the storage capacitor $C_{ST}$ is referred to as charging time. After the sufficient charging time, the voltage across the storage capacitors $C_{ST}$ is equal to the difference between the data voltage and the common voltage. After the TFT is turned off, the storage capacitor $C_{ST}$ maintains the orientation of the liquid crystal molecules with its voltage.

There exists latency for the gate voltage to be transferred from the leftmost pixel to the rightmost pixel. The gate voltage transferred to the rightmost pixel triggers the common line trigger circuit, and then the triggered common line trigger circuit provides the common voltage to the common line. Likewise, there exists latency for the common voltage to be transferred from the rightmost pixel to the leftmost pixel. All the above latency results in that, after a gate voltage is applied to the TFT, the common voltage is applied to the common electrode 108 after certain delay time. The above latency is an RC delay which is significantly impacted by resistance of the gate line and the common line as well as the related parasitic capacitance. Particularly, if the resistance is increased, the related parasitic capacitance is increased, and the latency is lengthened. The presence of the above latency shortens the charging time of the storage capacitors $C_{ST}$, as a result, the storage capacitors $C_{ST}$ cannot be charged to a predetermined voltage value and hence the liquid crystal molecules cannot be rotated to predetermined positions to implement the intended display.

Figure 2:
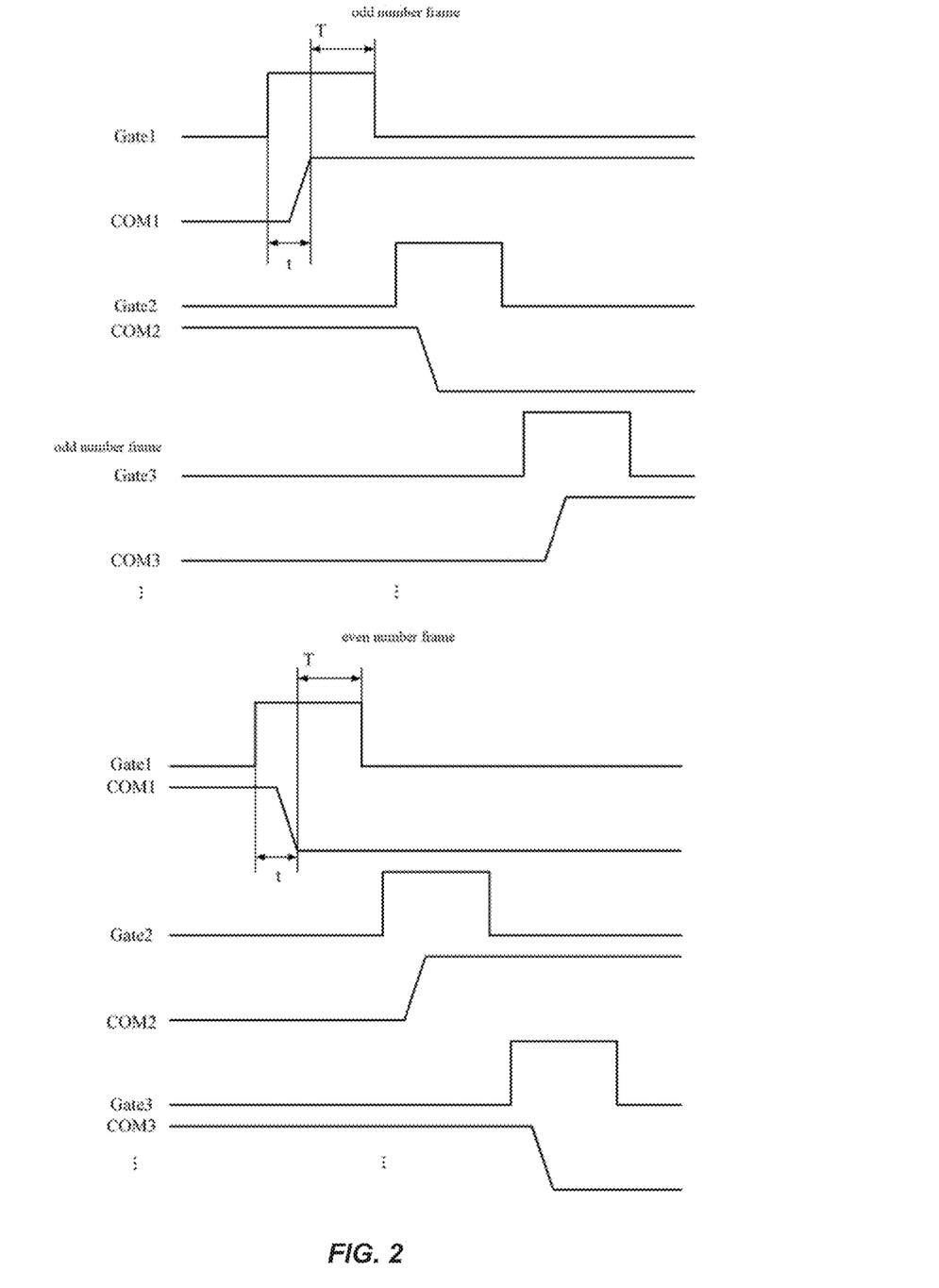
FIG. 2 is a diagram showing a time sequence of a driving approach of the traditional liquid crystal display device.

To maintain the polarities of the liquid crystal molecules, the liquid crystal display device may be driven by a driving approach with an unchanged common voltage and a driving approach with inverted common voltages. FIG. 2 shows a time sequence for the driving approach with inverted common voltages. As shown in FIG. 2, after each gate line is applied by a gate voltage, the applying of a common voltage to the common voltage line is later than the applying of the gate voltage because of the presence of the latency t, therefore the charging time T of the storage capacitors $C_{ST}$ is shortened, such that the voltage of the storage capacitor $C_{ST}$ cannot reach the difference between the data voltage and the common voltage, and hence the display effect is degraded.

With the increasing improved resolution of the liquid crystal display device, more and more gate lines and common lines are distributed on the liquid crystal panel, and the charging time for each storage capacitor $C_{ST}$ under the same refresh frequency is increasingly shortened. Meanwhile, a high aperture ratio of the liquid crystal panel requires for thinner gate lines and common lines, which causes larger resistance and hence lengthened RC delay. Based on the above two reasons, the effective charging time for the storage capacitor $C_{ST}$ is increasingly shortened, which has become a substantial problem degrading the resolution of the liquid crystal display device.

Therefore, it is necessary to develop a liquid crystal display device and a driving method of the liquid crystal display device, for reducing or eliminating the impact of the above latency to the storage capacitor $C_{ST}$.

BRIEF SUMMARY OF THE INVENTION

A liquid crystal display device is disclosed. The device comprises a plurality of data lines extending in a first direction, a plurality of gate lines extending in a second direction and intersecting the data lines, and a plurality of common lines in parallel with the plurality of gate lines and intersecting the data lines. The device also comprises at least one dummy gate line in parallel with the gate lines, a plurality of gate line trigger circuits for providing gate voltages to the plurality of gate lines and the at least one dummy gate line, and a plurality of common line trigger circuits for providing common voltages to the common lines. One end of the last gate line is connected with the last gate line trigger circuit, one end of each of remaining gate lines is connected with a gate line trigger circuit corresponding to said each of remaining gate lines, the other end of said each of the remaining gate lines is connected with the next gate line trigger circuit, the first common line trigger circuit is connected with one dummy gate line, and each of remaining common line trigger circuits is connected with one or more preceding gate line trigger circuits.

DETAILED DESCRIPTION OF THE INVENTION

Certain embodiments disclosed herein include at least one dummy gate line, where one end of the last gate line is connected with the last gate line trigger circuit; one end of each of remaining gate lines is connected with a gate line trigger circuit corresponding to said each of remaining gate lines and the other end is connected with the next gate line trigger circuit; and the first common line trigger circuit is connected with the dummy gate line, and each of remaining common line trigger circuits is connected with one or more preceding gate line trigger circuits. In this way, the gate line trigger circuit may provide a gate voltage to its corresponding gate line and trigger the gate line trigger circuit corresponding to the next gate line; meanwhile, the first common line trigger circuit is triggered by a signal transmitted via the dummy gate line, and each of remaining common line trigger circuits is triggered by one or more preceding gate line trigger circuits. That is, the common line trigger circuits are not triggered by the gate voltage of the same gate line, but triggered before the arrival of the gate voltage of this gate line. Therefore, the common voltage of the common line is applied to the common electrode before the gate voltage is applied, thereby ensuring that the charged capacitor is maintained in a charging state once the voltage of the pixel electrode is applied to the capacitor, such that the impact of the latency of the common voltage on the charging time is alleviated, and the display effect is improved.

In order for better understanding of certain principles, solutions and advantages of the invention, the invention is further detailed in conjunction with FIGS. 3-8.

First Embodiment

Figure 3:
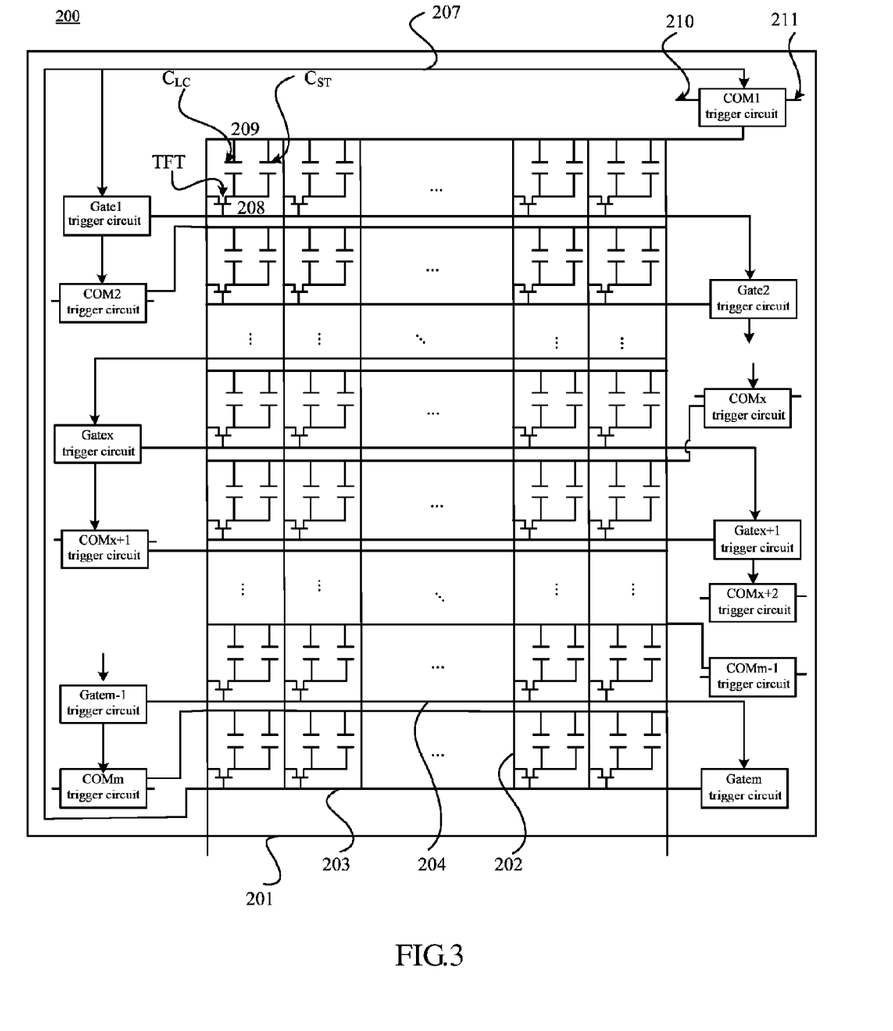
FIG. 3 is schematic view of a liquid crystal display device according to a first embodiment of the invention.

FIG. 3 is a schematic view showing a liquid crystal display device of the first embodiment of the invention. As shown in FIG. 3, the liquid crystal display device 200 includes a liquid crystal panel 201, a plurality of data lines 202 formed on the liquid crystal panel 201, a plurality of gate lines 203, a plurality of common lines 204, a plurality of gate line trigger circuits (including a trigger circuit Gate 1, a trigger circuit Gate 2, a trigger circuit Gate 3, a trigger circuit Gate 4 . . . a trigger circuit Gate m−1, and a trigger circuit Gate m), a plurality of common line trigger circuits (including a trigger circuit COM 1, a trigger circuit COM 2, a trigger circuit COM 3, a trigger circuit COM 4 . . . a trigger circuit COM m−1, and a trigger circuit COM m), and a dummy gate line 207.

As shown in FIG. 3, a first direction is defined by the vertical direction and a second direction is defined by the horizontal direction. The data lines 202 extend in the first direction, the gate lines 203 extend in the second direction and intersect with the data lines 202, and the dummy gate line 207 is in parallel with the gate lines 203. The liquid crystal panel 201 is provided with TFTs, each of which is configured to drive a liquid crystal element $C_{LC}$ and a storage capacitor $C_{ST}$ located at the intersection. The regions defined by the plurality of data lines 202 and the gate lines 203 are used as display regions. When a drive voltage is provided to a pixel electrode 208 via the data line 202 and a common voltage is provided to a common electrode 209 via the common line 204, an electric field is generated on the liquid crystal element $C_{LC}$ to change the arrangement of the liquid crystal molecules, so as to control the light transmittance of the liquid crystal element $C_{LC}$.

One dummy gate line, m common lines, m gate lines, m common line trigger circuits, and m gate line trigger circuits are shown in FIG. 3, wherein m is an even number. Both gate line trigger circuits connected with even number gate lines and common line trigger circuits connected with odd number common lines are located on one side (e.g. the left side) of the display regions, and both gate line trigger circuits connected with odd number gate lines and common line trigger circuits connected with even number common lines are located on the other side (e.g. the right side) of the display regions.

Additionally, this embodiment is applicable to a liquid crystal display device in which a liquid crystal driving electric field is in parallel with the liquid crystal panel 201. Each common line trigger circuit is connected with a first common voltage terminal 210 and a second common voltage terminal 211, which are used for providing a first common voltage $V_{COM}H$ and a second common voltage $V_{COM}L$ to the common lines. For a liquid crystal display device adopting a driving approach with the inverted common voltages, the first common voltage and the second common voltage have the same magnitude but different polarities. For example, the first common voltage $V_{COM}H$ is +5V and the second common voltage $V_{COM}L$ is −5V. Of course, in order to reduce power consumption, the first common voltage and the second common voltage may have different magnitudes, for example, the first common voltage $V_{COM}H$ is +5V and the second common voltage $V_{COM}L$ is 0V, which is not limited in the invention.

As shown in FIG. 3, one end of the dummy gate line 207 is connected to the first gate line trigger circuit, i.e. a trigger circuit Gate 1. One end of the trigger circuit Gate 1 which is connected to the first gate line is used to provide a gate voltage to the first gate line. Meanwhile, the other end of the dummy gate line 207 is connected to the first common line trigger circuit, i.e. a trigger circuit COM 1. The COM 1 trigger circuit is connected to the first common line to selectively provide a common electrode voltage to the first common line. The signal of the dummy gate line 207 is provided by the last gate line, and the first common line trigger circuit (i.e. the trigger circuit COM 1) is triggered by the gate voltage of the last gate line. The other end of the first gate line is connected to the second gate line trigger circuit, i.e. a trigger circuit Gate 2, and one end of the trigger circuit Gate 2 which is connected to the second gate line is used to selectively provide a gate voltage to the second gate line. Meanwhile, the first gate line trigger circuit is connected to the second common line trigger circuit, i.e. a trigger circuit COM 2, which is connected to the second common line to selectively provide a common electrode voltage to the second common line.

Likewise, the xth gate line trigger circuit is connected to one end of the xth gate line to selectively provide a gate voltage to the xth gate line, and the other end of the xth gate line is connected to the (x+1)th gate line trigger circuit. The (x+1)th gate line trigger circuit is meanwhile connected to the (x+1)th gate line to selectively provide a gate voltage to the (x+1)th gate line. Meanwhile, the xth gate line trigger circuit is connected to the (x+1)th common line trigger circuit, and the (x+1)th common line trigger circuit is connected to the (x+1)th common line to selectively provide a common voltage to the (x+1)th common line.

One end of the last gate line is connected to the last gate line trigger circuit, i.e. the trigger circuit Gate m, the other end of the last gate line is connected to the dummy gate line 207, to trigger the first gate line trigger circuit (i.e. the trigger circuit Gate 1) and the first common line trigger circuit (i.e. the trigger circuit COM 1).

Figure 4:
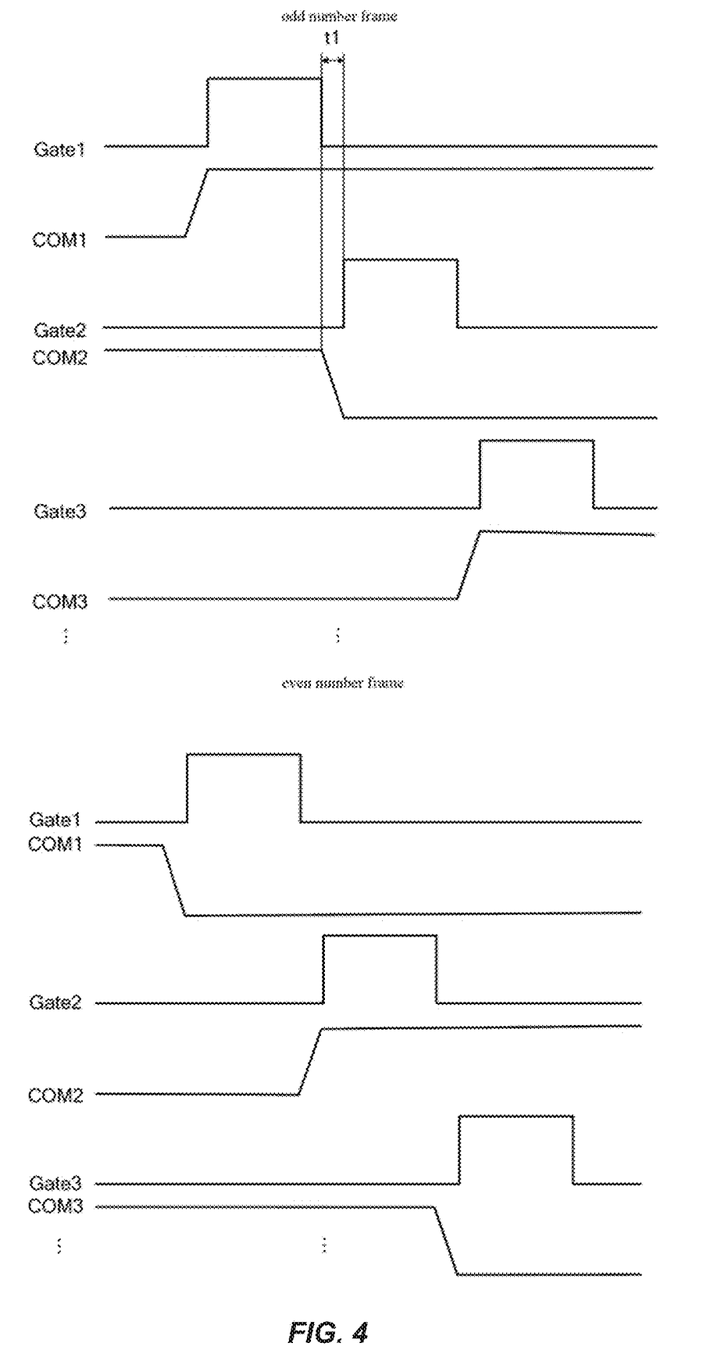
FIG. 4 is a diagram showing a time sequence of a driving approach of the liquid crystal display device according to the first embodiment of the invention.

FIG. 4 is diagram showing a time sequence of a driving approach of the liquid crystal display device according to the first embodiment of the invention. In the present embodiment, the liquid crystal display device is driven in the driving approach with the inverted common voltages. Particularly, FIG. 4 is a diagram showing a driving time sequence of the liquid crystal display device of the present embodiment under the driving approach with the inverted common voltages. The driving approach of the liquid crystal display device of the present embodiment is described in detail in conjunction with FIGS. 3 and 4.

After the signal of the dummy gate line 207 is transferred to the first gate line trigger circuit (i.e. the trigger circuit Gate 1), the trigger circuit Gate 1 provides a gate voltage to the first gate line. Meanwhile, the signal of the dummy gate line 207 is also transferred to the first common line trigger circuit (i.e. the trigger circuit COM 1). After being triggered, the trigger circuit COM 1 selectively provides a common voltage to the first common line. That is, the trigger circuit Gate 1 and the trigger circuit COM 1 are triggered simultaneously without any trigger latency. When the gate voltage begins to be transferred along the first gate line, the common voltage is transferred along the first common line.

Next, the gate voltage begins to be transferred along the first gate line from left to right, and arrives at the rightmost end of the first gate line after latency t1. The other end of the first gate line is connected to the second gate line trigger circuit, i.e. the trigger circuit Gate 2. After being triggered, the trigger circuit Gate 2 provides a gate voltage to the second gate line. After being triggered, the trigger circuit Gate 1 also sends a trigger signal to the trigger circuit COM 2. After being triggered, the trigger circuit COM 2 in turn selectively provides a common voltage to the second common line. That is, after the trigger circuit COM 2 is triggered, the trigger circuit Gate 2 is not triggered until the latency t1 elapses. That is, the trigger circuit COM 2 is triggered before the trigger circuit Gate 2 is triggered.

Likewise, after being triggered by the (x−1)th gate line, the trigger circuit Gate x selectively provides a gate voltage to the xth gate line, and the gate voltage is transferred along the xth gate line and arrives at the other end of the xth gate line after the latency t1, to subsequently trigger the trigger circuit Gate x+1. Meanwhile, when the gate voltage begins to be transferred along the xth gate line, the trigger circuit Gate x triggers the trigger circuit Gate x+1 and the trigger circuit COM x+1 begins to selectively provide a common voltage to the (x+1)th common line. That is, after the trigger circuit COM x+1 is triggered, the trigger circuit Gate x+1 is not triggered until the latency t1 elapses. That is, the trigger circuit COM x+1 is triggered before the trigger circuit Gate x+1 is triggered.

At last, after the last gate line trigger circuit (i.e. the trigger circuit Gate m) is triggered, the trigger circuit Gate m also sends a trigger signal to the dummy gate line 207 as the trigger signal for both the trigger circuit Gate 1 and the trigger circuit COM 1. Subsequently, the line-by-line triggering for the next period begins.

Second Embodiment

Figure 5:
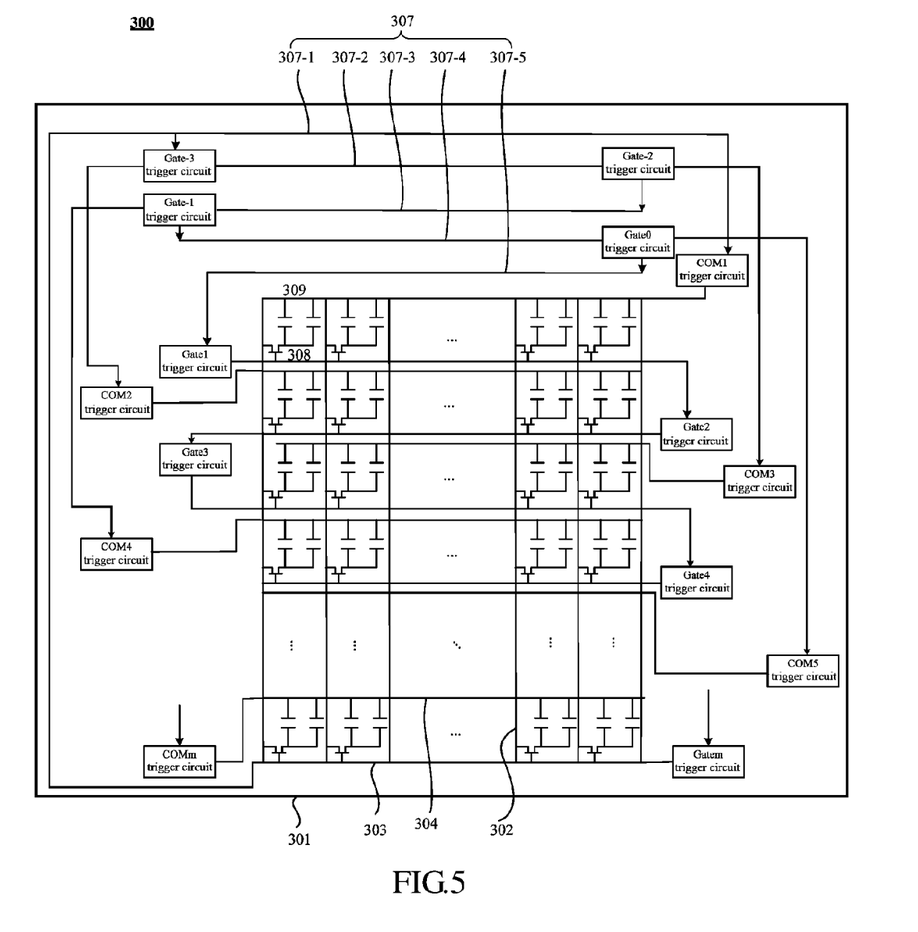
FIG. 5 is a schematic view of a liquid crystal display device according to a second embodiment of the invention.

FIG. 5 is schematic view of a liquid crystal display device of the second embodiment of the invention. As shown in FIG. 5, the liquid crystal display device 300 includes a liquid crystal panel 301, a plurality of data lines 302 formed on the liquid crystal panel 301, a plurality of gate lines 303, a plurality of common lines 304, a plurality of gate line trigger circuits, a plurality of common line trigger circuits, and a plurality of dummy gate lines 307. In this embodiment, there are 5 dummy gate lines, i.e. dummy gate lines 307-1, 307-2, 307+3, 307-4, and 307-5; there are m gate lines, m common lines, m+4 gate line trigger circuits (i.e. a trigger circuit Gate −3, a trigger circuit Gate −2, a trigger circuit Gate −1, a trigger circuit Gate 0, a trigger circuit Gate 1, a trigger circuit Gate 2, a trigger circuit Gate 3, a trigger circuit Gate 4 . . . and a trigger circuit Gate m), and m common line control circuits (including a trigger circuit COM 1, a trigger circuit COM 2, a trigger circuit COM 3, a trigger circuit COM 4, a trigger circuit COM 5 . . . and a trigger circuit COM m).

Additionally, TFTs are provided on the liquid crystal panel 101 to drive liquid crystal elements $C_{LC}$ and storage capacitors $C_{ST}$ located at the intersections. When a drive voltage is provided to a pixel electrode 308 via the data line 302 and a common voltage is provided to the common electrode 309 via the common line 304, an electric field is generated on the liquid crystal element $C_{LC}$ to change the arrangement of the liquid crystal molecules, so as to control the light transmittance of the liquid crystal element $C_{LC}$.

As shown in FIG. 5, one end of the first dummy gate line 307-1 is connected to the first gate line trigger circuit, i.e. the trigger circuit Gate −3, which is connected to one end of the second dummy gate line 307-2. Meanwhile, the other end of the first dummy gate line 307-1 is connected to the first common line trigger circuit, i.e. the trigger circuit COM 1, which is connected to the first common line. The other end of the second dummy gate line 307-2 is connected to the second gate line trigger circuit, i.e. the trigger circuit Gate −2, which is also connected to one end of the third dummy gate line 307-3. The other end of the third dummy gate line 307-3 is connected to the third gate line trigger circuit, i.e. the trigger circuit Gate −1. In the same way, one end of each gate line or dummy gate line is connected to a gate line trigger circuit, and the other end of the gate line or dummy gate line is connected to the next gate line trigger circuit.

As shown in FIG. 5, the first gate line trigger circuit (i.e. the trigger circuit Gate −3) is also connected to the second common line trigger circuit (i.e. the trigger circuit COM 2), and the second gate line trigger circuit (i.e. the trigger circuit Gate −2) is also connected to the third common line trigger circuit, i.e. the trigger circuit COM 3.

Likewise, each of the remaining common line trigger circuits is connected with one or more preceding gate line trigger circuits. In this embodiment, each of the remaining common line trigger circuits is connected with one preceding gate line trigger circuit.

One end of the last gate line is connected with the last gate line trigger circuit (i.e. the trigger circuit Gate m), and the other end of the last gate line is connected with the first dummy gate line 307-1 to trigger the first gate line trigger circuit (i.e. the trigger circuit Gate −3) and the first common line trigger circuit (i.e. the trigger circuit COM 1).

In this embodiment, dummy gate lines 307 are formed above the display regions. In another embodiment, the dummy gate lines 307 are formed below the display regions.

Figure 6:
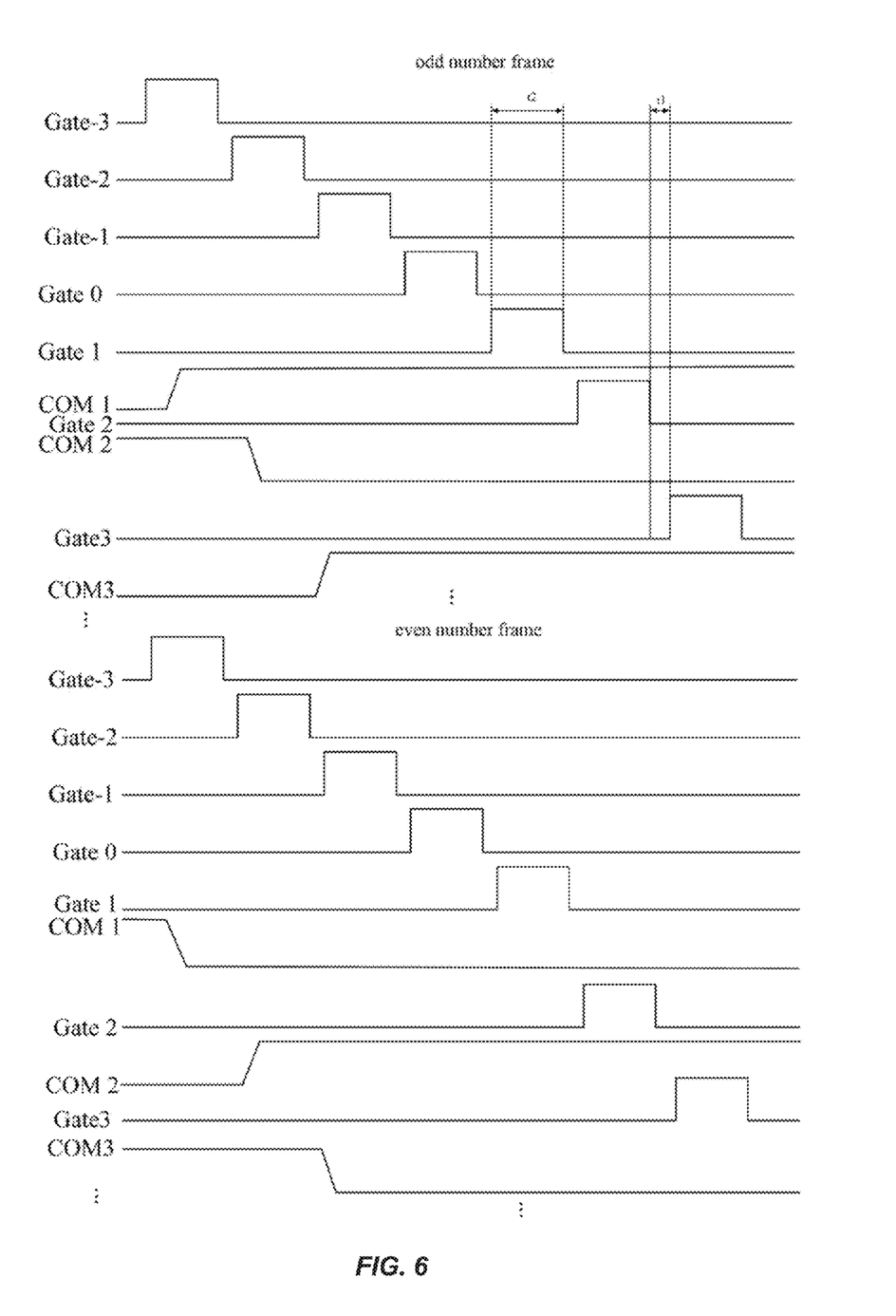
FIG. 6 is a diagram showing a time sequence of a driving approach of the liquid crystal display device according to the second embodiment of the invention.

FIG. 6 is a diagram showing a time sequence of a driving approach of the liquid crystal display device according to the second embodiment of the invention. In this embodiment, the liquid crystal display device is driven in the driving approach with the inverted common voltages. Particularly, FIG. 6 is a diagram showing a time sequence of the driving approach of the liquid crystal display device of the embodiment under the driving approach with the inverted common voltages.

The driving approach of the liquid crystal display device of the second embodiment is described in detail in conjunction with FIGS. 5 and 6.

After the signal of the first dummy gate line 307-1 is transferred to the first gate line trigger circuit (i.e. the trigger circuit Gate −3), the gate voltage of the trigger circuit Gate −3 triggers the second gate line trigger circuit (i.e. the trigger circuit Gate −2) through the second dummy gate line 307-2. In the same way, the gate voltage of the trigger circuit Gate 0 triggers the fifth gate line trigger circuit (i.e. the trigger circuit Gate 1) through the fifth dummy gate line 307-5. After being triggered, the trigger circuit Gate 1 provides a gate voltage to the first gate line, and the gate voltage begins to be transferred along the first gate line from left to right and arrives at the rightmost end of the first gate line after latency t1. The other end of the first gate line is connected to the trigger circuit Gate 2, which is triggered after certain charging time t2 to provide a gate voltage to the second gate line. That is, the gate line trigger circuit (i.e. the trigger circuit Gate 1) connected with the first gate line will not be triggered until the gate voltage is transferred through 4 dummy gate lines, that is, the gate line trigger circuit connected with the first gate line will not be triggered until four multiples of the latency t1 and the charging time t2 elapses after the trigger circuit Gate −3 is triggered.

The signal of the first dummy gate line 307-1 triggers the first gate line trigger circuit (i.e. the trigger circuit Gate −3) and the first common line trigger circuit (i.e. the trigger circuit COM 1) simultaneously. Similarly, the Gate −3 trigger circuit, when providing the gate voltage to the second dummy gate line 307-2, simultaneously provides a trigger signal to the second common line trigger circuit (i.e. the trigger circuit COM 2), and the trigger circuit COM 2 is triggered to provide a common voltage to the second common line. That is, the common line trigger circuit (i.e. the trigger circuit COM 1) connected with the first common line is triggered simultaneously while the trigger circuit Gate −3 is triggered.

In the same way, after the trigger circuit Gate x is triggered by the (x−1)th gate line, the trigger circuit Gate x selectively provides a gate voltage to the xth gate line, and the gate voltage begins to be transferred along the xth gate line. The trigger circuit COM y is connected to and triggered by the trigger circuit Gate x. However, the trigger circuit COM y is triggered by the trigger signal of the trigger circuit Gate x that is delayed by n multiples of the latency. That is, the trigger circuit COM y is triggered earlier than the trigger circuit Gate y by the sum of n multiples of the latency t1 and the charging time t2.

That is, the time when the common voltage of each common line is provided is earlier than the time when the gate voltage of the gate line corresponding to the common line by time of n*(t1+t2). In this embodiment, n=5. Therefore, the time when the common voltage of each common line is provided is earlier than the time when the gate voltage of the gate line corresponding to the common line by time of 5*(t1+t2).

In comparison with the first embodiment, the time when the common voltage of each common line is provided is much advanced with respect to the time when the gate voltage of the gate line is provided in the second embodiment, so as to ensure that the voltage of the common electrode 309 is always maintained at the common voltage during the time when the TFT is turned on. However, the time amount, by which the time when the common voltage is provided is earlier than the time when the gate voltage is provided, depends on the number of the dummy gate lines. That is, more dummy gate lines cause that the common line trigger circuit may be triggered much more earlier. However, the increased dummy gate lines occupy more space on the liquid crystal panel, and the area of the effective display regions is decreased accordingly. Therefore, the number of the dummy gate lines shall be selected to strike a balance between reducing the impact of the latency to the charging time and maintaining the area of the effective display regions as large as possible. Preferably, the number of the dummy gate lines is equal to or less than 5.

Third Embodiment

Figure 7:
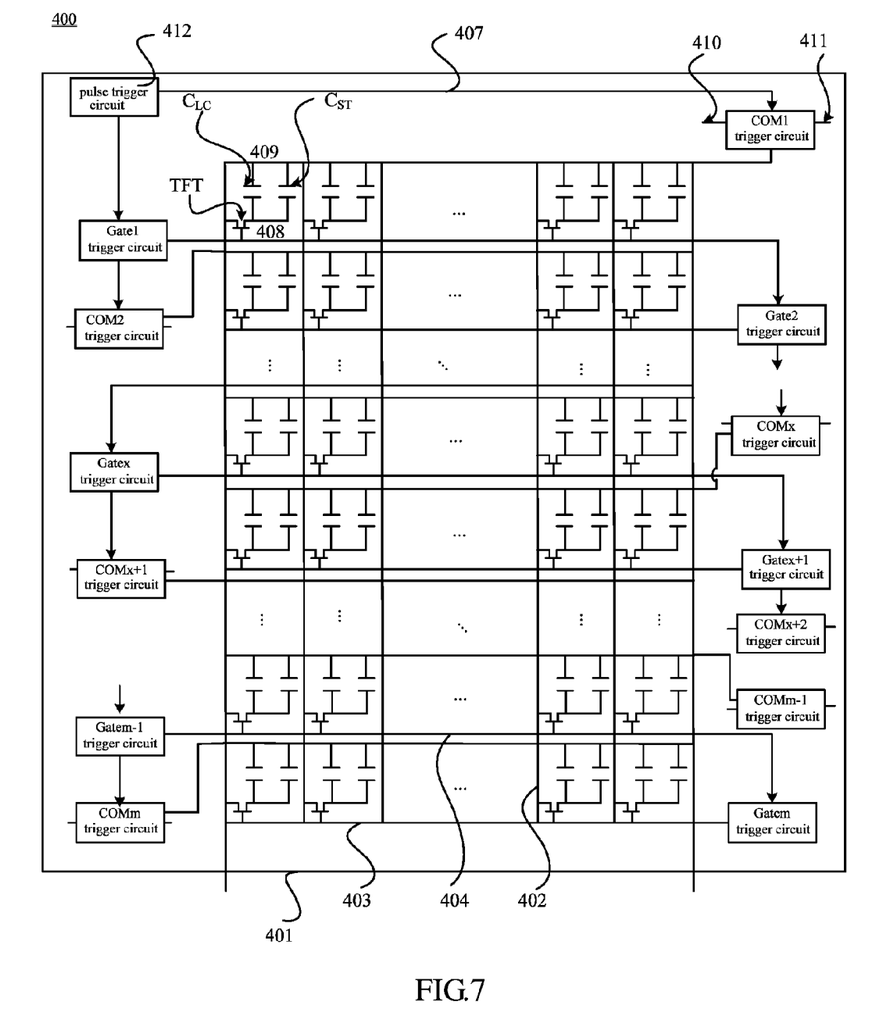
FIG. 7 is a schematic view of a liquid crystal display device according to a third embodiment of the invention.

FIG. 7 is a schematic view showing a liquid crystal display device of the third embodiment of the invention. As shown in FIG. 7, the liquid crystal display device 400 includes a liquid crystal panel 401, a plurality of data lines 402 formed on the liquid crystal panel 401, a plurality of gate lines 403, a plurality of common lines 404, a plurality of gate line trigger circuits (including a trigger circuit Gate 1, a trigger circuit Gate 2, a trigger circuit Gate 3, a trigger circuit Gate 4 . . . a trigger circuit Gate m−1, and a trigger circuit Gate m), a plurality of common line trigger circuits (including a trigger circuit COM 1, a trigger circuit COM 2, a trigger circuit COM 3, a trigger circuit COM 4 . . . a trigger circuit COM m−1, and a trigger circuit COMm), a dummy gate line 407 and a periodic pulse trigger circuit 412.

As shown in FIG. 7, the data lines 402 extend in the first direction, the gate lines 403 extend in the second direction and intersect with the data lines 402, and the dummy gate line 407 is in parallel with the gate lines 403. TFTs are provided on the liquid crystal panel 401 to drive liquid crystal elements $C_{LC}$ and storage capacitors $C_{ST}$ located at the intersections. When a drive voltage is provided to a pixel electrode 408 via the data line 402 and a common voltage is provided to a common electrode 409 via the common line 404, an electric field is generated on the liquid crystal element $C_{LC}$ to change the arrangement of the liquid crystal molecules, so as to control the light transmittance of the liquid crystal element $C_{LC}$.

As shown in FIG. 7, the periodic pulse trigger circuit 412 is connected to one end of the dummy gate line 407, and the other end of the dummy gate line 407 is connected to the first common line trigger circuit, i.e. the trigger circuit COM 1, which is connected to the first common line to selectively provide a common electrode voltage to the first common line.

Moreover, the periodic pulse trigger circuit 412 is connected to the first gate line trigger circuit, i.e. the trigger circuit Gate 1, which is connected to one end of the first gate line to provide a gate voltage to the first gate line. The periodic pulse trigger circuit 412 triggers both the first gate line trigger circuit (i.e. the trigger circuit Gate 1) and the first common line trigger circuit (i.e. the trigger circuit COM 1). The other end of the first gate line is connected to the second gate line trigger circuit, i.e. the trigger circuit Gate 2, which is connected to one end of the second gate line to selectively provide a gate voltage to the second gate line. Meanwhile, the first gate line trigger circuit is connected to the second common line trigger circuit, i.e. the trigger circuit COM 2, which is connected to the second common line to selectively provide a common electrode voltage to the second common line.

In the same way, the xth gate line trigger circuit is connected to one end of the xth gate line to selectively provide a gate voltage to the xth gate line, while the other end of the xth gate line is connected to the (x+1)th gate line trigger circuit, which is meanwhile connected to the (x+1)th gate line to selectively provide a gate voltage to the (x+1)th gate line. Meanwhile, the xth gate line trigger circuit is connected to the (x+1)th common line trigger circuit, and the (x+1)th common line trigger circuit is connected to the (x+1)th common line to selectively provide a common voltage to the (x+1)th common line.

Finally, one end of the last gate line is connected to the last gate line trigger circuit, i.e. the trigger circuit Gate m.

In comparison with the first and second embodiments, both the first gate line trigger circuit and the first common line trigger circuit are triggered by the periodic pulse trigger circuit 412 in the present embodiment. The time for scanning all the gate lines and the common lines for one time is equal to one period of the periodic pulse trigger circuit 412.

Figure 8:
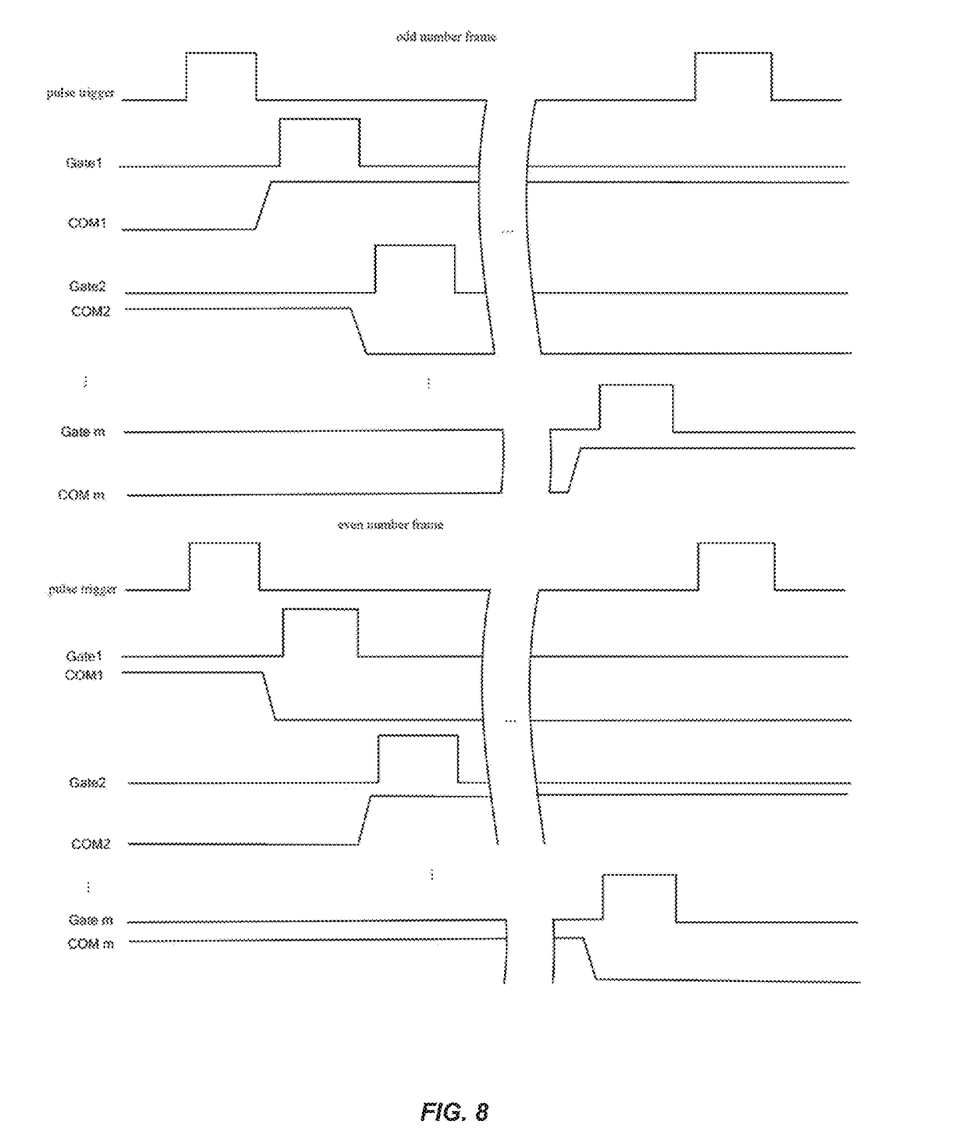
FIG. 8 is a diagram showing a time sequence of a driving approach of the liquid crystal display device according to the third embodiment of the invention.

FIG. 8 is a diagram showing a time sequence of a driving approach of the liquid crystal display device according to the third embodiment of the invention. The driving approach of the liquid crystal display device of this embodiment will be described in detail in conjunction with FIGS. 7 and 8.

After the signal of the periodic pulse trigger circuit 412 triggers the first gate line trigger circuit, i.e. the trigger circuit Gate 1, the trigger circuit Gate 1 in turn provides a gate voltage to the first gate line. Moreover, the signal of the periodic pulse trigger circuit 412 is transferred to the first common line trigger circuit (i.e. the trigger circuit COM 1) through the dummy gate line 407, and the triggered trigger circuit COM 1 selectively provides a common electrode voltage to the first common line.

Next, the gate voltage begins to be transferred along the first gate line from left to right, and arrives at the rightmost end of the first gate line. The other end of the first gate line is connected to the second gate line trigger circuit, i.e. the trigger circuit Gate 2, which provides a gate voltage to the second gate line after being triggered. After being triggered, the trigger circuit Gate 1 also sends a trigger signal to the trigger circuit COM 2, and the triggered trigger circuit COM 2 in turn selectively provides a common voltage to the second common line.

In the same way, after being triggered by the (x−1)th gate line, the trigger circuit Gate x selectively provides a gate voltage to the xth gate line. The gate voltage is transferred along the xth gate line, and is transferred to the other end of the xth gate line, and then triggers the trigger circuit Gate x+1. Meanwhile, when the gate voltage begins to be transferred along the xth gate line, the trigger circuit Gate x triggers the trigger circuit COM x+1, which in turn begins to selectively provide a common voltage to the (x+1)th common line.

At last, after being triggered, the last gate line trigger circuit (i.e. the trigger circuit Gate m) provides a gate voltage to the last gate line. Moreover, after being triggered, the last common line trigger circuit (i.e. the trigger circuit COMm) provides a common voltage to the last common line. One period of the periodic pulse trigger circuit 412 is finished once the scanning of both the last gate line and the last common line is completed.

Subsequently, the periodic pulse trigger circuit 412 proceeds to the next period, and the line-by-line triggering for the next period begins.

In this embodiment, the periodic pulse trigger circuit 412 is used for the triggering of both the first gate line trigger circuit and the first common line trigger circuit. Therefore, in comparison with the first and second embodiments, the pulse trigger circuit is used in the present embodiment for better control on products.

As can be seen, a plurality of dummy gate lines are introduced in the present invention, a gate line trigger circuit is triggered by a dummy gate line or a gate line, and each gate line trigger circuit further triggers a certain next common line trigger circuit. That is, the common line trigger circuit is not triggered by the gate voltage of the same gate line, but is triggered before the arrival of the gate voltage of the gate line. Therefore, the common voltage of the common line may be applied to the common line before the gate voltage is applied, thus ensuring that the charged capacitor is always maintained at a charged state after the pixel electrode voltage is applied, such that the impact of the latency of the common voltage to the charging time is reduced or eliminated.

It should be noted that, embodiments are described in a step-up way in the description, that is, differences of each embodiment from the previous embodiments are described, but reference is made to the previous embodiments for some identical or similar parts of said each embodiment with respect to the previous embodiments.

Various modifications and variations may be made by those skilled in the art without departing from the principle and scope of the invention. Thus, all these modifications and variations are intended to be included in this invention if they fall within the scope of the claims of the invention and their equivalents.

What is claimed is:

1. A liquid crystal display device, comprising:
a plurality of data lines extending in a first direction;
a plurality of gate lines extending in a second direction and intersecting the data lines;
a plurality of common lines in parallel with the plurality of gate lines and intersecting the data lines;
at least one dummy gate line in parallel with the gate lines;
a plurality of gate line trigger circuits for providing gate voltages to the plurality of gate lines or the at least one dummy gate line; and
a plurality of common line trigger circuits for providing common voltages to the common lines,
wherein one end of the last gate line is connected with the last gate line trigger circuit, wherein one end of each of remaining gate lines is connected with a gate line trigger circuit corresponding to said each of remaining gate lines, and wherein the other end of said each of the remaining gate lines is connected with the next gate line trigger circuit, wherein the first common line trigger circuit is connected with one dummy gate line, and wherein each of remaining common line trigger circuits is connected with one or more preceding gate line trigger circuits.

2. The liquid crystal display device of claim 1, wherein pixel regions defined by the plurality of data lines and the plurality of gate lines are display regions.

3. The liquid crystal display device of claim 2, wherein the dummy gate line is formed above or below the display regions.

4. The liquid crystal display device of claim 2, wherein the gate lines comprise even number gate lines and odd number gate lines, and the common lines comprise even number common lines and odd number common lines.

5. The liquid crystal display device of claim 4, wherein both the gate line trigger circuits connected with the even number gate lines, and the common line trigger circuits connected with the odd number common lines are located on one side of the display regions.

6. The liquid crystal display device of claim 5, wherein both the gate line trigger circuits connected with the odd number gate lines and the common line trigger circuits connected with the even number common lines are located on the other side of the display regions.

7. The liquid crystal display device of claim 1, wherein the at least one dummy gate line comprises one dummy gate line, and the other end of the last gate line is connected with the one dummy gate line.

8. The liquid crystal display device of claim 1, wherein the at least one dummy gate line comprises a plurality of dummy gate lines, the other end of the last gate line is connected with the first dummy gate line, and one end of each of remaining dummy gate lines is connected with a gate line trigger circuit corresponding to said each of remaining dummy gate lines, and the other end of said each of the remaining dummy gate lines is connected with the next gate line trigger circuit.

9. The liquid crystal display device of claim 1, wherein, if the at least one dummy gate line consists of one dummy gate line, said one dummy gate line is connected with a periodic pulse trigger circuit.

10. The liquid crystal display device of claim 1, wherein the at least one dummy gate line comprises a plurality of dummy gate lines, the first dummy gate line is connected with a periodic pulse trigger circuit, one end of each of remaining dummy gate lines is connected with a gate line trigger circuit corresponding to said each of remaining dummy gate lines, and the other end of said each of the remaining dummy gate lines is connected with a next gate line trigger circuit.

11. The liquid crystal display device of claim 1, further comprising a first common voltage terminal and a second common voltage terminal, which are each connected with the common line trigger circuit and used for providing the common lines with a first common voltage and a second common voltage.

12. The liquid crystal display device of claim 11, wherein the first common voltage and the second common voltage have the same magnitude and different polarities.

13. The liquid crystal display device of claim 11, wherein the magnitude of the first common voltage or the second common voltage is zero.

14. A driving method of a liquid crystal display device of claim 1, comprising:
providing, by a gate line trigger circuit, a gate voltage to a gate line corresponding to the gate line trigger circuit, and triggering a next gate line trigger circuit; and
triggering the first common line trigger circuit by a signal transmitted by a dummy gate line, wherein each of remaining common line trigger circuits is triggered by one or more preceding gate line trigger circuits.

15. The driving method of a liquid crystal display device of claim 14, wherein only one dummy gate line is present, the other end of the last gate line is connected with the dummy gate line, and a gate voltage of the last gate line is used to trigger the first common line trigger circuit.

16. The driving method of a liquid crystal display device of claim 14, wherein a plurality of the dummy gate lines are present, the other end of the last gate line is connected with the first dummy gate line, a gate voltage of the last gate line is used to trigger the first common line trigger circuit, one end of each of remaining dummy gate lines is connected with a gate line trigger circuit corresponding to said each of remaining dummy gate lines, and the other end of said each of the remaining dummy gate lines is connected with a next gate line trigger circuit, so that the next gate line trigger circuit is triggered by its preceding gate line trigger circuit.

17. The driving method of a liquid crystal display device of claim 14, wherein only one dummy gate line is present, and the dummy gate line is connected with a periodic pulse trigger circuit, which is used to trigger the first common line trigger circuit.

18. The driving method of a liquid crystal display device of claim 14, wherein a plurality of dummy gate lines are present, the first dummy gate line is connected with a periodic pulse trigger circuit, which is used to trigger the first common line trigger circuit, one end of each of remaining dummy gate lines is connected with a gate line trigger circuit corresponding to said each of remaining dummy gate lines, and the other end of said each of the remaining dummy gate lines is connected with a next gate line trigger circuit, so that the next gate line trigger circuit is triggered by its preceding gate line trigger circuit.

19. The driving method of a liquid crystal display device of claim 14, further comprising a first common voltage terminal and a second common voltage terminal, which are connected with the common line trigger circuit and used for selectively providing the common lines with a first common voltage and a second common voltage.

* * * * *